United States Patent [19]

Beardsley

[11] 4,228,870
[45] Oct. 21, 1980

[54] SCAFFOLD DEVICE FOR HARVESTING AND MAINTAINING FRUIT TREES

[76] Inventor: Paul F. Beardsley, Van Wert, Iowa

[21] Appl. No.: 965,029

[22] Filed: Nov. 30, 1978

[51] Int. Cl.³ ............................................. A01D 46/24
[52] U.S. Cl. .................................... 182/127; 182/115; 182/130
[58] Field of Search ............... 182/130, 131, 132, 127, 182/115, 12, 63

[56] References Cited

U.S. PATENT DOCUMENTS

| 1,921,631 | 8/1933 | Miller | 182/130 |
| 3,085,650 | 4/1963 | Merk | 182/131 |
| 3,272,282 | 9/1966 | Sanders | 182/131 |
| 3,311,191 | 3/1967 | Hiyama | 182/131 |
| 3,352,380 | 11/1967 | Barney | 182/131 |
| 3,356,181 | 12/1967 | Granger | 182/131 |
| 4,113,055 | 9/1978 | Gleockler | 182/127 |

FOREIGN PATENT DOCUMENTS 215068  5/1958  Australia .................................. 182/131

*Primary Examiner*—Reinaldo P. Machado
*Attorney, Agent, or Firm*—Zarley, McKee, Thomte, Voorhees & Sease

[57] ABSTRACT

A scaffold device for harvesting and maintaining fruit trees is disclosed comprising a frame structure adapted for securement to a movable support means such as a conventional pick-up truck, a generally semi-circular open ended catwalk attached to the frame structure and residing in an elevated horizontal plane, and an upstanding ladder attached to the catwalk and extending upwardly therefrom and inclined toward the center of the semi-circle.

5 Claims, 4 Drawing Figures

SCAFFOLD DEVICE FOR HARVESTING AND MAINTAINING FRUIT TREES

BACKGROUND OF THE INVENTION

This invention relates to a scaffolding device for harvesting and pruning fruit trees and more particularly to a scaffold device adapted for detachable securement to a pick-up truck.

Previously, ladders were extensively utilized for supporting individuals in harvesting or pruning fruit trees. The use of ladders, however, is inefficient, time consuming, inconvenient and somewhat hazardous. Ladders do not provide a sufficient range of accessibility to the tree, both circumferentially and vertically, and therefore require numerous changes of position to harvest the tree. The repositioning of the ladder along with the excessive climbing necessitated by the repositioning results in an inefficient use of labor and time. The limited accessibility of a ladder, together with the excessive climbing and repositioning also contributed in some degree to accidents.

SUMMARY OF THE INVENTION

A scaffold device for harvesting and maintaining fruit trees is disclosed comprising a frame structure adapted for securement to a movable support means such as a pick-up truck, a generally semi-circular open ended catwalk attached to the frame structure and residing in an elevated horizontal plane, and an upstanding ladder attached to the catwalk and extending upwardly therefrom toward the center of the semi-circle. By securement of the scaffold device to a pick-up truck, the truck and scaffold may be easily maneuvered to provide access to a substantial portion of the fruit tree by means of the catwalk and upwardly extending ladder. Detachable securement to the pick-up truck allows quick and easy assembly and disassembly of the scaffold.

Therefore, it is a principal object of the present invention to provide an improved scaffold device for harvesting or maintaining fruit trees.

A still further object of the invention is to provide a scaffold device that is efficient in use so as to save labor and time.

A still further object of the invention is to provide a scaffold device that allows substantial circumferential and vertical access to a fruit tree.

A still further object of the invention is to provide a scaffold device for harvesting or maintaining fruit trees that may be mounted on a mobile support structure.

A still further object of the invention is to provide a scaffold device for harvesting or maintaining fruit trees that is easily and simply detachably secured to a conventional pick-up truck.

A still further object of the invention is to provide a scaffold device for harvesting or maintaining fruit trees that allows substantial circumferential access to a fruit tree by providing a semi-circular catwalk.

A still further object of the invention is to provide a scaffold device for harvesting or maintaining fruit trees which is economical to manufacture, durable in use, refined in appearance, and easily assembled and disassembled from a pick-up truck.

DESCRIPTION OF THE PREFERRED EMBODIMENT

Figures 1, 2, 3, 4:
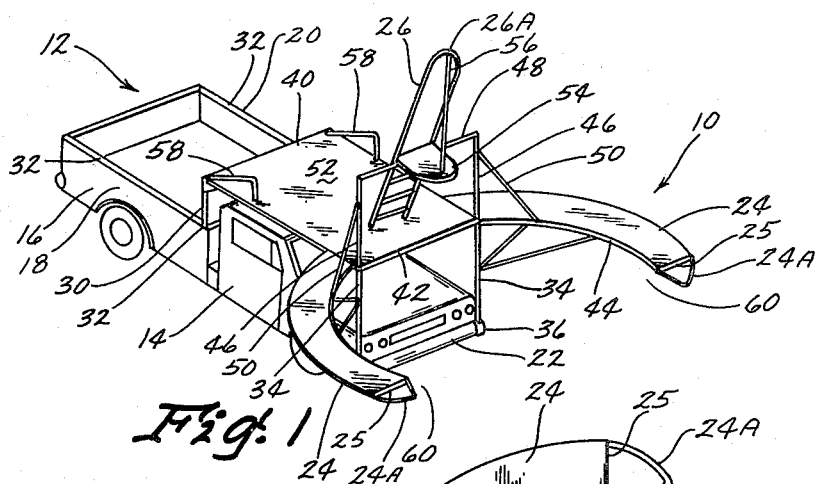
FIG. 1 is a perspective view of the present invention mounted on a conventional pick-up truck.
FIG. 2 is a top view of the present invention.
FIG. 3 is an elevated front view of the device shown in FIG. 1.
FIG. 4 is an elevated side view of the device shown in FIG. 1.

The scaffold device for harvesting or maintaining fruit trees of this invention is generally designated by the numeral 10 and is shown mounted to a pick-up truck 12 in FIG. 1.

Pick-up truck 12 is a conventional style pick-up truck having a cab 14, truck bed 16 formed by opposite sidewalls 18 and 20, and a forward bumper 22.

Scaffold device 10 is generally comprised of a semi-circular catwalk 24, an upstanding ladder 26, and a frame support structure generally designated by the numeral 28. Frame support structure 28 is detachably secured to truck 12 by means of rear posts or stanchions 30 being slidably received within the conventional stanchion receiving apertures 32 of side walls 18 and 20 and forward posts or stanchions 34 being detachably secured to bumper mounts 36. Transverse braces 38 extend from stanchions 34 to support the outer reaches of catwalk 24 (FIG. 3). Catwalk 24 is thus supported by both braces 38 and stanchions 34. Platform 40 is secured to catwalk 24 and extends rearwardly therefrom as shown in FIG. 1. Stanchions 30 are connected to the rear portion of platform 40 to support platform 40 in a generally horizontal plane with catwalk 24 as shown in FIGS. 1 and 3.

V-shaped brackets 24A are attached to the forward edges 25 of catwalk 24 and extend forwardly therefrom to buffer the tree limbs upon positioning of scaffold device 10 as described in more detail hereinafter.

The forward edge 42 of platform 40 is more or less coincident with a portion of the inner edge of catwalk 24 (FIG. 2) and has a pair of oppositely disposed stanchions 46 extending upwardly therefrom. Rail 48 connects the upper ends of stanchions 46 as shown in FIG. 1. Braces 50 extend forwardly and downwardly from stanchions 46 to provide additional support. Ladder 26 is secured at its lower end to the upper support surface 52 of platform 40 and, as can best be seen in FIGS. 1 and 2, ladder 26 is inclined forwardly towards the center of semi-circular catwalk 24 so as to form an acute angle with the plane in which the catwalk 24 and platform 40 reside.

Rail 48 supportably engages ladder 26 to provide support to maintain this inclined position. Attached to ladder 26 and extending forwardly therefrom is shelf 54. Shelf 54 is supported by brace 56 connecting shelf 54 to the upper portion of ladder 26 as shown in FIG. 1. Guard rails 58 are attached to the rearward portion of platform 40 and provide a hand support for mounting platform 40 from truck bed 16.

The open ended portion 60 of semi-circular catwalk 24 extends forwardly from truck 12 and, as can be seen from FIGS. 1 and 4, the forward edge 42 of platform 40 is vertically aligned with bumper 22 such that ladder 26 extends forwardly beyond bumper 22 as does catwalk 24 (FIG. 2).

In operation, truck 12 is driven up to the fruit tree to be harvested or pruned and aligned such that catwalk 24 encompasses the tree and forward edge 42 abuts the tree or even penetrates between the branches. The semi-circular catwalk 24 provides the fruit picker with substantial circumferential access to the tree. Ladder 26 allows access to the uppermost regions of the tree. A person standing on platform 54 can lean against the upper portion 26A of ladder 26 to reach the upper center portion of the tree. Portion 26A normally engages the chest area of the average size adult. After the picking operation is completed as to that portion of the tree, the truck is realigned relative to the tree to allow access to the remainder of the tree. The truck is normally moved 180° to the opposite side of the tree. The brackets 24A cause any branches engaging the ends of catwalk 24 to part to reduce any branch breakage. As can be seen, alignment of the scaffold device 10 relative to the tree is easily accomplished and substantial circumferential and vertical access is provided by each alignment operation. The picker standing on catwalk 24 is free to use both hands and can cover a large portion of the tree for each repositioning operation. The amount of labor and time expended is reduced because the number of repositioning operations is reduced as compared to ladders. Repositioning is quicker and less hazardous, and excessive climbing is eliminated.

The scaffold device also provides a safer and more convenient working surface in that the catwalk surface is flat and smooth for worker stability and the worker can utilize both hands in picking. Also, the load does not have to be carried any significant distance but rather the fruit can be directly loaded from platform 40 into the truck bed, thus eliminating the additional reloading step from the ground to the truck bed. The fruit picker normally places the picked fruit in an apron, and the fruit is next deposited in containers on platform 40. By reducing the amount of fruit handling, damage to the fruit is reduced. Also, the pickers are in a better position to observe and reach the fruit.

Thus, it can be seen that this device accomplishes at least all of its stated objectives.

What is claimed is:

1. A scaffold device for picking and maintaining fruit trees, comprising,
   a movable truck support means having forward and rearward ends and a longitudinal axis,
   a single semi-circular catwalk defining an arc of substantially 180° fixedly mounted on said support means and having left and right hand portions oppositely and symmetrically spaced with respect to the longitudinal axis of said support means,
   said catwalk being mounted in an elevated position and extending forwardly beyond said support means so that said catwalk can be directed by the position of said support means to a position embracing a substantial portion of the circumference of a tree without interference of said support means with said tree.

2. The device of claim 1 wherein said truck support means has a centrally located cab, a platform means extending over said cab substantially to the forward end thereof, said left and right-handed portions of said catwalk each extending forwardly and outwardly from the forward end of said platform.

3. The device of claim 2 wherein a frame means extends upwardly from the forward end of said platform, a ladder means extending upwardly and forwardly from said platform means and being supported by said frame means wherein the top portion of said ladder extends forwardly and beyond the forward end of said truck support means.

4. The device of claim 2 wherein said truck support means has a bed rearwardly of said cab wherein fruit picked and deposited on said platform means can be easily loaded into said bed.

5. The device of claim 3 wherein said ladder means has a shelf near its center portion to permit a person to stand thereon and lean forwardly against the upper portion of said ladder means in a supporting position while picking fruit from the center upper portion of a tree.

* * * * *